May 9, 1933.                C. H. PICKERING ET AL                1,907,441
                                COOKING UTENSIL
                              Filed Sept. 8, 1930
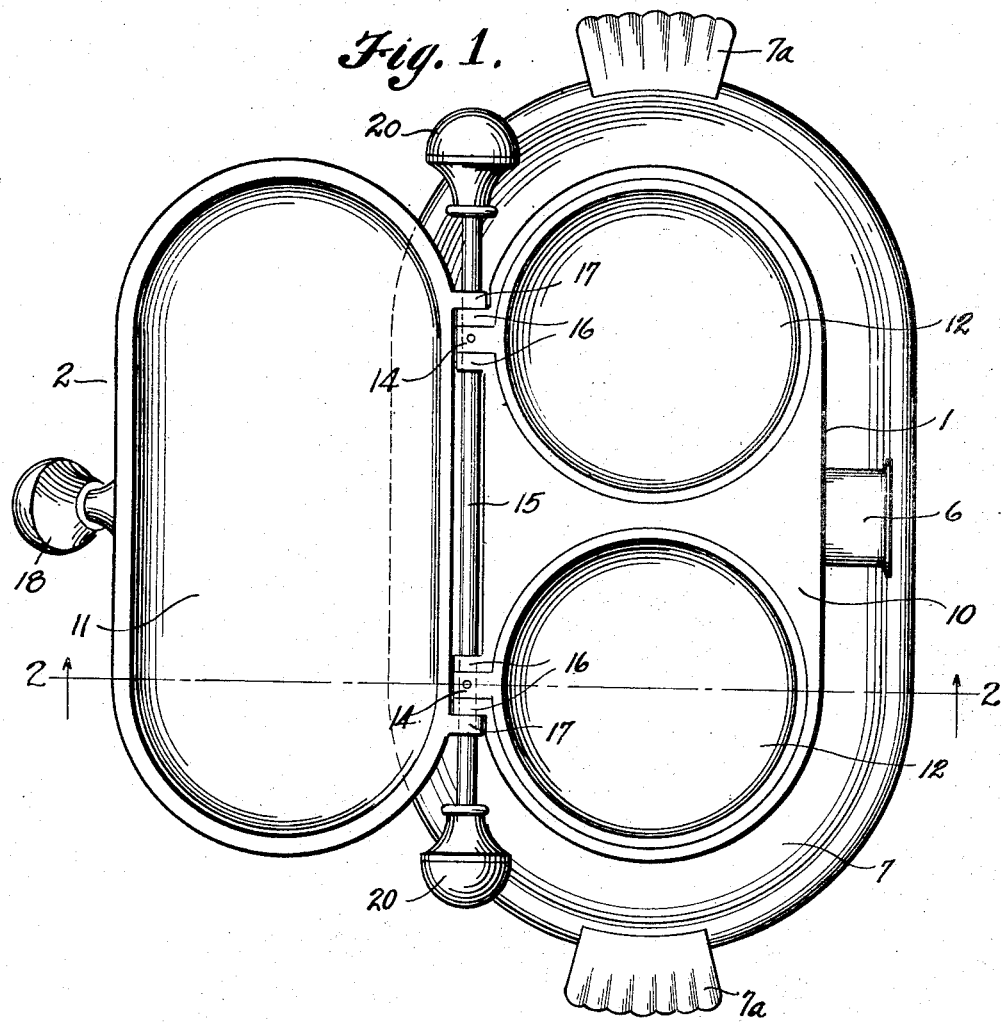
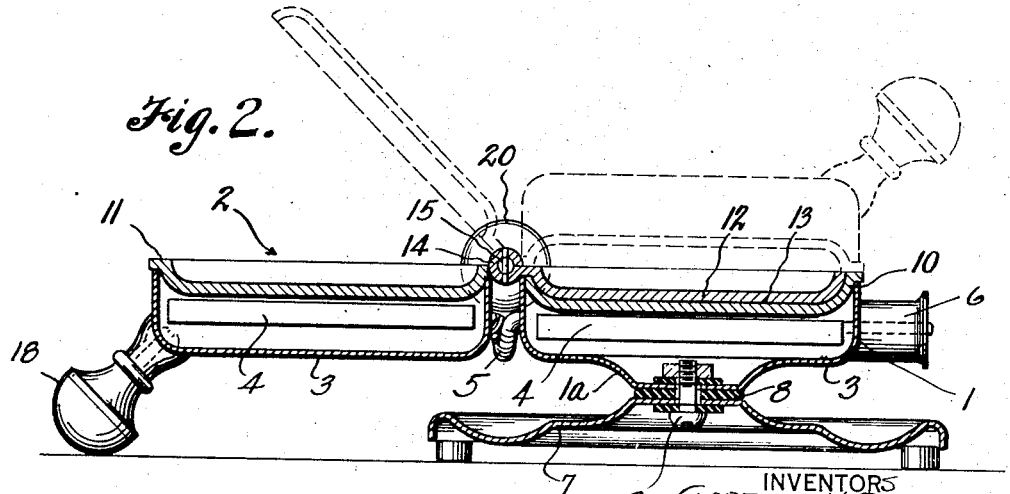
INVENTORS
CLARENCE H. PICKERING
JOHN CAMPBELL
BY
Cook & Robinson
ATTORNEY Patented May 9, 1933

1,907,441

UNITED STATES PATENT OFFICE

CLARENCE H. PICKERING AND JOHN CAMPBELL, OF SEATTLE, WASHINGTON

COOKING UTENSIL

Application filed September 8, 1930. Serial No. 480,428.

This invention relates to improvements in cooking utensils, and it has reference in particular to devices for cooking hot cakes, or the like, it being the principal object of the invention to provide novel and convenient means in a device of that character whereby cakes placed thereon may be turned over after being cooked on one side for cooking on the other side.

More specifically stated, the present invention resides in the provision of an electrically heated cooking utensil comprising complemental, paired sections, or heating surfaces, on which cakes may be cooked, with shallow molds arranged to rest upon one of the surfaces, and to receive the cake batter and to cook the cakes therein on one side; the said molds being pivotally mounted and movable by means of a handle to swing upwardly and over to such position as to deposit the cakes in an inverted position on the other heated surface to cook on the other side, while the molds are then returned to initial position to again receive batter.

Other objects of the invention reside in the various details of construction, and in the combination of parts, and in their mode of operation, as will hereinafter be described.

In accomplishing these objects of the invention, we have provided the improved details of construction, the preferred forms of which are illustrated in the accompanying drawing, wherein—

Fig. 1 is a plan view of the device opened for use.

Fig. 2 is a cross sectional view on the line 2—2 in Fig. 1.

Referring more in detail to the drawing—

In a prefered embodiment of the device, it comprises a pair of electrically heated sections, disposed side by side when the device is in use, and having the top surfaces designed for the cooking of cakes thereon. Preferably, the two sections are hinged together and, when not in use, may be closed together for convenience in handling and storage, as are the ordinary types of waffle molds.

As illustrated in the drawing, the two complemental sections of the device are designated, generally, by reference numerals 1 and 2, respectively. Each section comprises a metallic frame portion, or housing 3, which may be polished or decorated as desired to enhance the appearance of the utensil. Within each of the frames, or housings, is an electrical heating element 4. These may be of any desired or suitable construction, and are electrically connected by wires contained within a flexible, protective conduit 5 which permits of the opening apart and closing together of the hinged sections.

The section 1 is provided at one side with the usual outlet 6 adapted to receive a plug for connecting the device with an electric circuit. It is provided also with supports 1ª whereby it is mounted on a base plate, or stand 7. Preferably there are insulating washers 8, of fibre or other suitable material, disposed between the parts 1ª and the base plate 7 and the several parts are held securely together by screw bolts 9 which are extended through the base, washer, and supports, as illustrated in Fig. 2.

As herein shown, the base plate is somewhat larger than the section 1, and is provided at the ends with handles 7ª. It is to be understood, however, that the particular design or shape of the base portion and also of the heated sections 1 and 2 has no particular bearing on the invention and may be anything suitable.

The heated section 1 is provided in the top surface of its frame with a plate 10 which is adapted to be heated by its element 4; likewise, the section 2 is provided in the top surface of its frame with a plate 11 adapted to be heated by its corresponding element 4. The main surface of the plate 11 preferably is depressed somewhat below the rim portion thereof as shown in Fig. 4, forming a sort of shallow pan. The plate 10, however, is provided in its top surface with two circular depressions 13 within which shallow, plate molds 12 are adapted to fit. These molds are provided at one side with lugs 14 whereby they are securely fixed to a shaft 15, which serves as a handle for inverting the molds and also as a hinge pin for attaching the sections 1 and 2 together. In the construction, as best illustrated in Fig. 1, the top plate 10 of the section 1, which is securely fixed in its frame or housing, has paired lugs 16 integral therewith at one side and the top plate 11 of the section 2 likewise has lugs 17. The various lugs 14, 16 and 17 of the molds, and plates 10 and 11 respectively, are alined to receive the shaft 15 therethrough as a hinge pin. The shaft then serves as the medium about which the section 2 may be opened and closed.

For the purpose of opening and closing the section 2, it is provided with a handle 18 which serves as a support for the section when it is open, and holds the section substantially level with respect to the section 1.

At the opposite ends of the shaft 15 are knobs 20 by means of which it may be rotated to swing the mold plates upwardly from within the plate 10, and over through the arc indicated in Fig. 4, to an inverted position over the plate 11.

Assuming that the device is so constructed, it would be used as follows: First, the section 2 would be opened outwardly as from the dotted line position shown in Fig. 2, to the full line position, at which the top plates 10 and 11 of the heated sections are substantially horizontal and in the same plane with the plate molds 12 disposed within the recesses in the plate 10, the cake batter is first placed therein. After the cakes thus formed have cooked on one side, the molds are swung upwardly and over, by rotating the shaft 15 by means of one of the knobs 20 at its ends. This operation deposits the two cakes on the plate 11 for cooking on their other sides, and while they are thus cooking, the molds returned to initial position, are again filled with batter. When the first cakes have cooked and have been removed from plate 11, the second set may then be deposited on the plate and the molds again filled.

While we have shown the device to be equipped with two molds, it is readily apparent that it may be equipped with one or more, as desired. Also, the molds may be in the form shown, or may consist simply of flat plates adapted to rest flatly upon the plate 10. It is also apparent that the heated sections may be hinged together, or if it is desired, might be made in a rigid frame and not designed for closing together.

Utensils of this character provide for the easy and quick cooking of cakes, and, if constructed with the cooking plates of aluminum, or other suitable material, the cooking may be done without the use of grease. This permits the device to be used satisfactorily as a table cooker.

No invention is herein claimed in the design or minor details of construction, but it is desired that the claims be given an interpretation commensurate with the scope of the invention.

Having thus described our invention what we claim as new therein and desire to secure by Letters Patent, is:

1. A cake cooker comprising complemental heated surfaces and a cake turning means arranged for hinged movement between said surfaces and adapted to rest on one of said heated surfaces to receive the cake thereon for cooking on one side and adapted to be moved about its hinge to an inverted position to deposit the cake in an inverted position on the other heated surface for cooking on its other side.

2. A cake cooking utensil comprising a pair of electrically heated plates, a mold plate adapted to rest on one of said heated plates to receive the cake for cooking on one side, a hinged mounting for said mold plate provided with handle means for actuating the mold to a position for depositing the cake therefrom on the other heated plate for cooking its other side.

3. A cake cooking utensil comprising a pair of hingedly connected sections, a rotatable shaft serving as a hinge pin whereby the sections are joined together; each of said sections having a top plate on which cakes may be cooked and containing means therein for heating the plates, cake molds disposed on one of said plates to receive the cakes therein for cooking on one side, means rigidly connecting the molds to the said shaft, and handles at the ends of the shaft whereby it may be rotated to swing the molds to positions to deposit the cakes therefrom in inverted positions on the plate of the other section.

4. A cake cooking utensil comprising upper and lower complemental sections hingedly connected to permit the upper section to swing from closed to open position, a rotatable shaft serving as a hinge pin for joining said sections; each of said sections having a top plate, and containing an electrically heated element therein for heating its plate, one of said plates having depressions therein, cake molds disposed in said depressions and adapted to receive the cakes therein for cooking on one side, means rigidly connecting the molds with the hinge shaft and handles at the ends of the shaft whereby it may be rotated to swing the molds over to deposit the cakes therefrom in inverted positions on the plate of the other section.

Signed at Seattle, Washington, this 28th day of August 1930.

CLARENCE H. PICKERING.
JOHN CAMPBELL.